United States Patent [19]

Tsuruta

[11] Patent Number: 4,564,407
[45] Date of Patent: Jan. 14, 1986

[54] MANUFACTURING METHOD AND MANUFACTURING EQUIPMENT FOR PLASTIC AIR CELL CUSHIONING MATERIAL

[75] Inventor: Orihiro Tsuruta, Tomioka, Japan

[73] Assignee: Orihiro Co., Ltd., Japan

[21] Appl. No.: 600,492

[22] Filed: Apr. 16, 1984

[30] Foreign Application Priority Data

Nov. 11, 1983 [JP] Japan ................... 58-210951

[51] Int. Cl.$^4$ .................................... B29D 23/00
[52] U.S. Cl. .................................. 156/147; 156/156; 156/198; 156/203; 156/285; 156/292; 156/308.4; 156/466; 428/178
[58] Field of Search ............... 156/145, 146, 147, 156, 156/285, 292, 308.4, 466, 198, 203; 428/178

[56] References Cited

U.S. PATENT DOCUMENTS

| | | | |
|---|---|---|---|
| 2,908,601 | 10/1959 | Brown | 156/198 |
| 3,226,285 | 12/1965 | Iovenko | 156/198 X |
| 3,290,198 | 12/1966 | Lux et al. | 156/198 |
| 3,868,285 | 2/1975 | Troy | 156/147 |
| 4,076,872 | 2/1978 | Lewicki et al. | 428/178 X |

FOREIGN PATENT DOCUMENTS 784999  5/1958  United Kingdom ............... 156/198

Primary Examiner—Robert A. Dawson
Attorney, Agent, or Firm—McGlew and Tuttle

[57] ABSTRACT

A manufacturing method for a cushioning material of air-filled film, wherein a plastic film sheet formed into a cylindrical shape is transversely fusion-bonded so that small air-filled cells are fabricated continuously. Manufacturing equipment is provided with a means for forming a plastic film into a cylindrical shape, a longitudinal sealing means, a roller means, and a transverse sealing means.

2 Claims, 6 Drawing Figures

MANUFACTURING METHOD AND MANUFACTURING EQUIPMENT FOR PLASTIC AIR CELL CUSHIONING MATERIAL

BACKGROUND OF THE INVENTION

1. Field of the Invention

The invention relates to a manufacturing method and to manufacturing equipment for a new cushioning material made of air-filled film.

2. Description of the Prior Art

To date, the packing of articles such as electrical appliances and precision machinery has been done by putting the articles inside corrugated cardboard boxes or the like and filling cushioning materials such as styrofoam or wood chips between the articles and the inner walls of the boxes. Since such cushioning materials are used when the articles are to be shipped, a large amount of cushioning materials must be stored where the articles are manufactured, requiring a very large amount of space for storage and great care as to storage conditions depending on the kind of cushioning materials, including flammable materials.

If the materials are disposed of after use by burning, they may generate harmful gases, causing problems of environmental pollution. Further, if the materials are buried in the earth, they may not readily decompose, causing a different kind of environmental pollution.

SUMMARY OF THE INVENTION

A new cushioning material will now be described hereunder which eliminates the defects of the aforementioned conventional cushioning materials. As shown in FIG. 1, a cushioning material 1 is a long strip-like body of cylindrical plastic film which is divided into a number of small cells 1a, 1b, 1c, . . . , each cell being filled with air. The cushioning material 1 is wound around the outer periphery of an article 2, and is packed in a corrugated cardboard box 3, together with the article, to function as a cushion. If this new cushioning material is used, the amount of material required for packing becomes very small and the disposition of used material becomes very easy.

However, at present, this kind of cushioning material is at the stage of experimental production, and an efficient manufacturing method and manufacturing equipment have not yet been commercialized. For that reason, the development of such a manufacturing method and such manufacturing equipment has been desirable.

This invention has been made in view of the above and its object to provide a manufacturing method which makes possible the efficient manufacture of the above cushioning material and also manufacturing equipment which is simple and economical for executing this manufacturing method.

The object of the invention and the advantages arising therefrom will be more fully understood from the following description, with reference to the accompanying drawings.

DETAILED DESCRIPTION OF THE INVENTION

The invention comprises a manufacturing method characterized in that a plastic film sheet is formed into a cylindrical shape and fusion-bonded in the longitudinal direction to form a cylindrical body, the end thereof being fusion-bonded in the transverse direction, whereafter the cylindrical body is fed downward, air being introduced inside thereof and at the same time the expansion of the cylindrical body being restricted by at least one pair of forming plates, and an air-filled small cell is formed by fusion-bonding at a predetermined distance from the fusion-bonded end of the air-filled cylindrical body, the above cycle being repeated thereafter; and manufacturing equipment characterized in that the equipment consists of a cylindrical device for forming a plastic film sheet into a cylindrical shape, a longitudinal sealer arranged below the cylindrical device, a pair of guide rollers arranged below the longitudinal sealer, a pair of restrictor rolls arranged below and at a distance from the guide rollers, a transverse sealer arranged below the restrictor rolls, and at least one pair of forming plates arranged above and/or under the transverse sealer.

DISCLOSURE OF THE PREFERRED EMBODIMENT

The invention will be described hereunder by way of an example with reference to the accompanying drawings.

Figure 2:
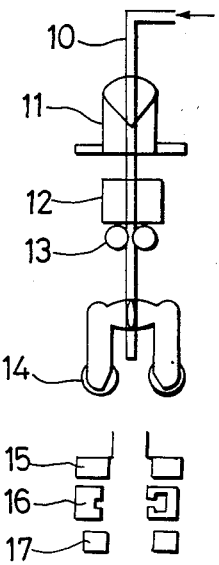
FIG. 2 is a schematic side view of equipment according to the invention.

FIG. 2 shows a schematic view of equipment for executing the invention. The equipment comprises an air supply tube 10 extending downward from the top of the equipment, a cylindrical device 11 for forming a plastic film sheet into a cylindrical shape, a longitudinal sealer 12 arranged below the cylindrical device 11 for longitudinally fusion-bonding both edges of the plastic film sheet formed into the cylindrical shape, a pair of guide rollers 13 arranged below the longitudinal sealer 12, a pair of restrictor rolls 14 arranged below and at a distance from the guide rollers 13, a pair of first forming plates 15 arranged below the restrictor rolls 14, and kept at a predetermined distance from each other, so as to control the inflation of the sealed cylinder a transverse sealer 16 arranged below the first forming plates 15 for transversely fusion-bonding the cylindrical film sheet, and a pair of second forming plates 17 arranged below the transverse sealer 16. The first forming plates 15 may be eliminated.

Figure 3A:
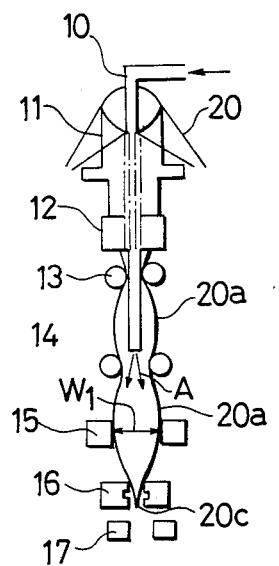
FIGS. 3A, 3B and 3C are schematic views illustrating the sequential steps of the method according to the invention.
Figures 3B, 3C:
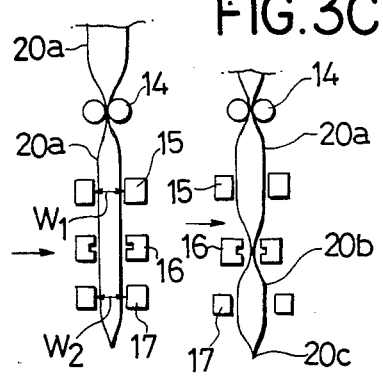

The manufacturing method for cushioning material using the above-mentioned equipment will be described hereunder. As shown in FIG. 3(A), a plastic film sheet 20 is formed by the cylindrical device 11 into a cylindrical shape and fusion-bonded in the longitudinal direction by the longitudinal sealer 12 to form cylindrical film 20a. The cylindrical film 20a is fed downward through the guide rollers 13, passed through the restrictor rolls 14 (closed in FIG. 3B) and the forming plates 15 and transversely fusion-bonded by the transverse sealer 16, the leading end 20C thereof being closed. The air tube 10 is arranged inside the cylindrical film 20a and supplies air inside the cylindrical film 20a as shown by the arrows A after the leading end 20C has been fusion-bonded. At this time the first forming plates 15 are held apart at a predetermined distance so that the cylindrical film 20a is kept to a predetermined thickness. Next, as shown in FIGS. 3B and 3C, the transverse sealer 16 is sequentially closed so that the cylindrical film 20a is fusion-bonded transversely to form the small cell 20b, air being contained therein.

Figure 4:
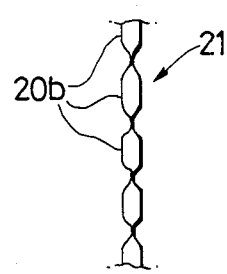
FIG. 4 is a vertical section of the cushioning material manufactured according to the invention.

By repeating the cycle described above, a long cushioning material 21 having a number of small cells 20b interconnected is fabricated as shown in FIG. 4.

Figure 1:
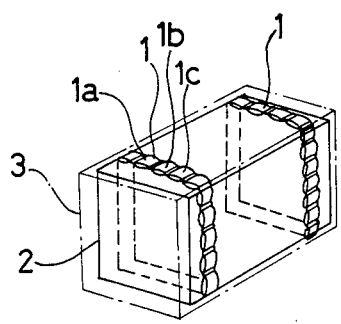
FIG. 1 is a perspective view showing the condition during use of the cushioning material manufactured according to the invention.

When the long cushioning material 21 is actually used, it is cut into the required length such as the cushioning material 1 shown in FIG. 1.

As it can be understood that other embodiments can be constructed without deviating from the concept and scope of the invention, the invention should not be limited to the example heretofore described except to what is claimed.

According to the invention, this new type of cushioning material can be continuously and very efficiently fabricated from a plastic film sheet, and yet the manufacturing equipment for the cushioning material is simply constructed. If the equipment is installed in the shipping section of a plant and used to fabricate the cushioning material as required, the raw material can be stored in the form of plastic film sheets, with storage taking up a very small amount of space.

What is claimed is:

1. A method for manufacturing cushioning material consisting of air-filled plastic cells, which comprises the following sequential steps:
   (a) forming a single sheet of plastic film into a cylindrical shape;
   (b) fusion bonding said cylindrical shape along the entire longitudinal edges thereof to form a cylindrical body;
   (c) advancing downwardly said cylindrical body while concurrently fusion bonding the leading end of said body transversely to the downward direction of movement of said body;
   (d) introducing air into the open end of said cylindrical body;
   (e) intermittently restricting the expansion of said cylindrical body with at least one pair of forming plates transversely to the direction of movement of the body;
   (f) fusion bonding said cylindrical body at predetermined distances from said fusion bonded lead end to form individual, air filed cells in a sequential manner.

2. Apparatus for carrying out the method of claim 1, comprising:
   (a) a cylindrical member for shaping a sheet of plastic film into a cylindrical shape;
   (b) a longitudinal sealer arranged beneath said cylindrical member, for fusion bonding said sheet into a cylindrical body;
   (c) a first pair of rollers positioned beneath said longitudinal sealer, for guiding said cylindrically shaped sheet in a downward direction;
   (d) a second pair of rollers positioned spacedly beneath said first pair of rollers, for restricting the inflation of said cylindrical body;
   (e) a transverse sealer positioned beneath said second pair of rollers, for fusion bonding said body transversely to the downward direction; and
   (f) at least one pair of forming plates positioned above and/or beneath said transverse sealer for forming the size of the individual cells in said cylindrical body.

* * * * *